Sept. 11, 1962 R. A. SHEPHERD 3,053,176
ADDRESSING MACHINE
Filed May 25, 1959 10 Sheets-Sheet 1

INVENTOR:
ROBERT A. SHEPHERD
BY
Howson & Howson
ATTYS.

Sept. 11, 1962 R. A. SHEPHERD 3,053,176
ADDRESSING MACHINE
Filed May 25, 1959 10 Sheets-Sheet 2
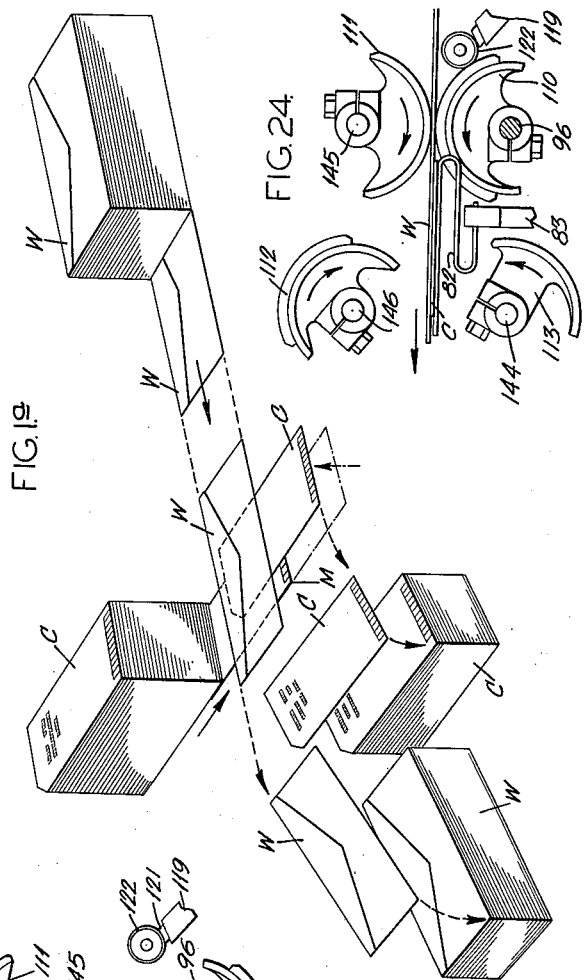
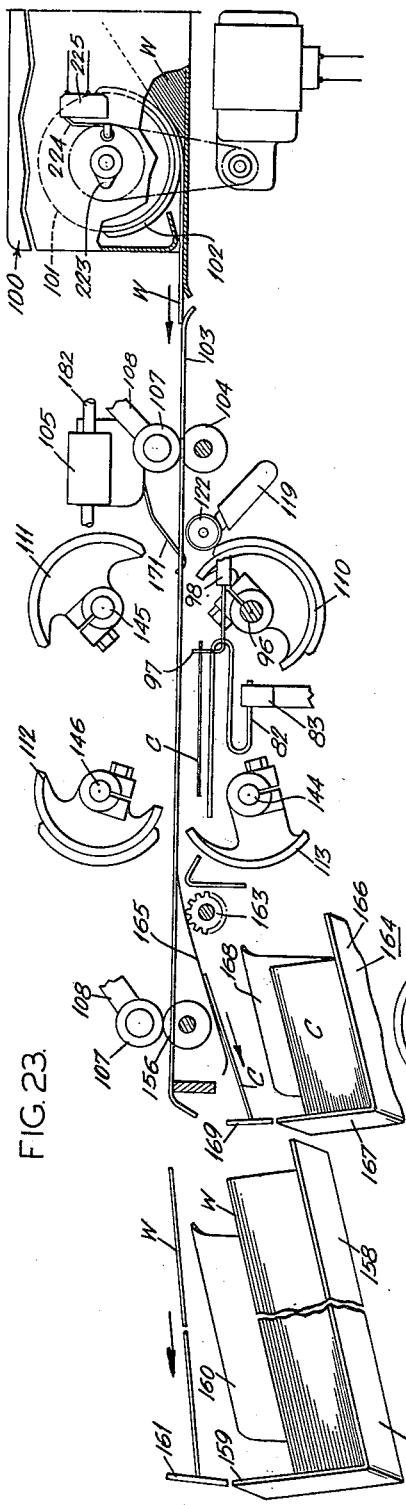
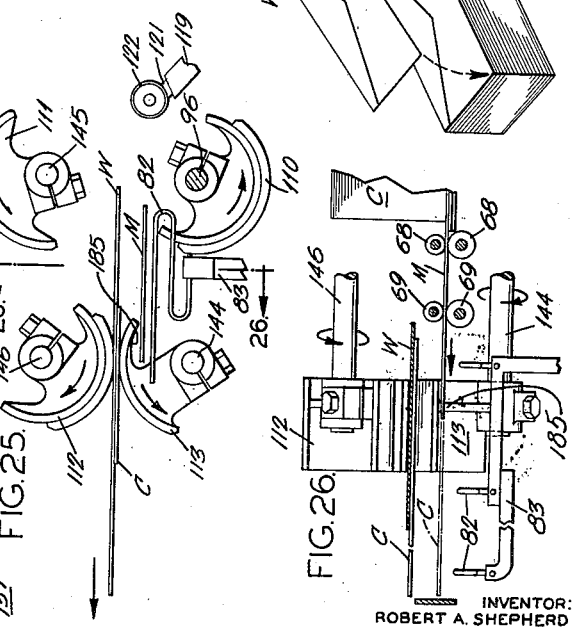
INVENTOR:
ROBERT A. SHEPHERD
BY Howson & Howson
ATTYS.

Sept. 11, 1962 — R. A. SHEPHERD — 3,053,176
ADDRESSING MACHINE
Filed May 25, 1959 — 10 Sheets-Sheet 3

INVENTOR:
ROBERT A. SHEPHERD
BY Howson & Howson
ATTYS.

Sept. 11, 1962 R. A. SHEPHERD 3,053,176
ADDRESSING MACHINE
Filed May 25, 1959 10 Sheets-Sheet 4

INVENTOR:
ROBERT A. SHEPHERD
BY Howson & Howson
ATT'YS.

Sept. 11, 1962 R. A. SHEPHERD 3,053,176
ADDRESSING MACHINE
Filed May 25, 1959 10 Sheets-Sheet 5

INVENTOR:
ROBERT A. SHEPHERD
BY Howson &
Howson
ATTYS.

Sept. 11, 1962
R. A. SHEPHERD
3,053,176
ADDRESSING MACHINE
Filed May 25, 1959
10 Sheets-Sheet 6
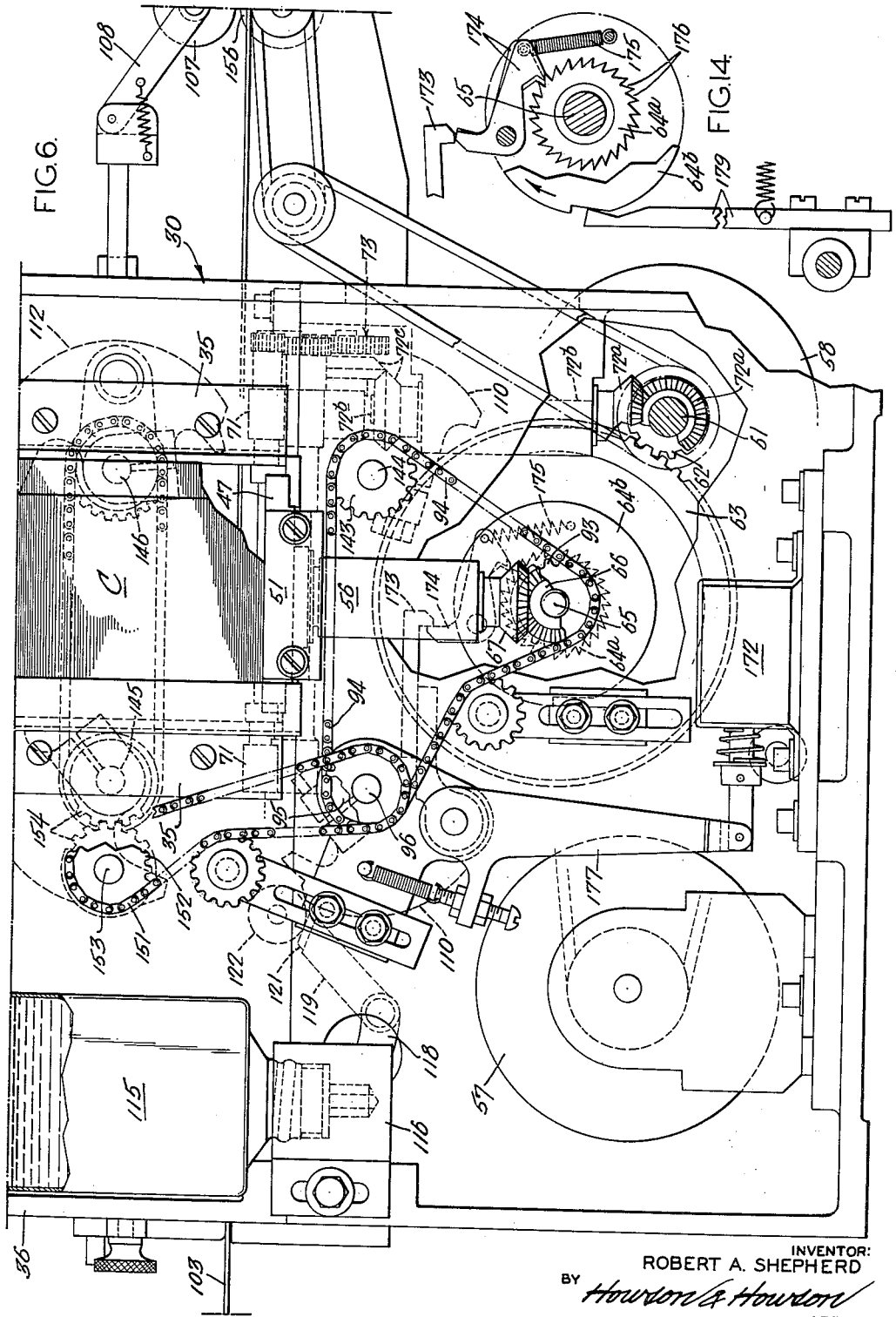
INVENTOR:
ROBERT A. SHEPHERD
BY Howson & Howson
ATTYS.

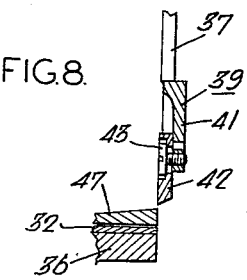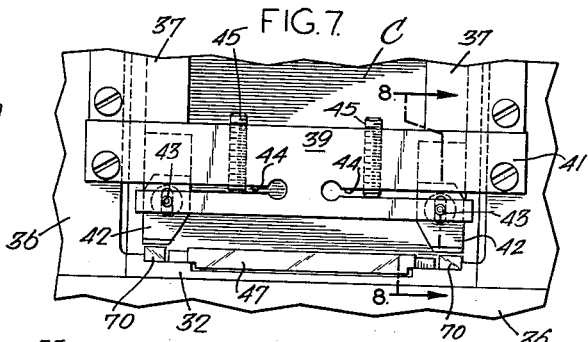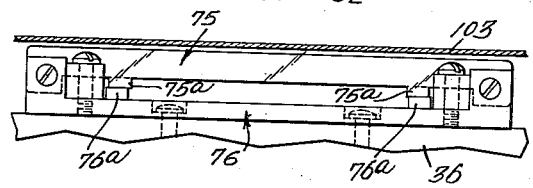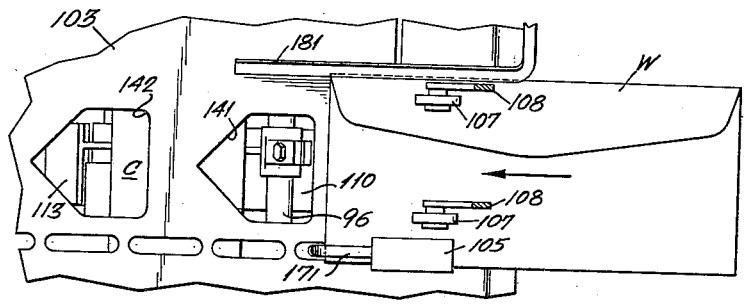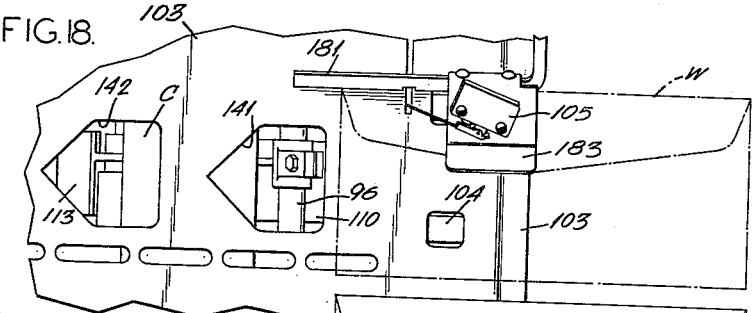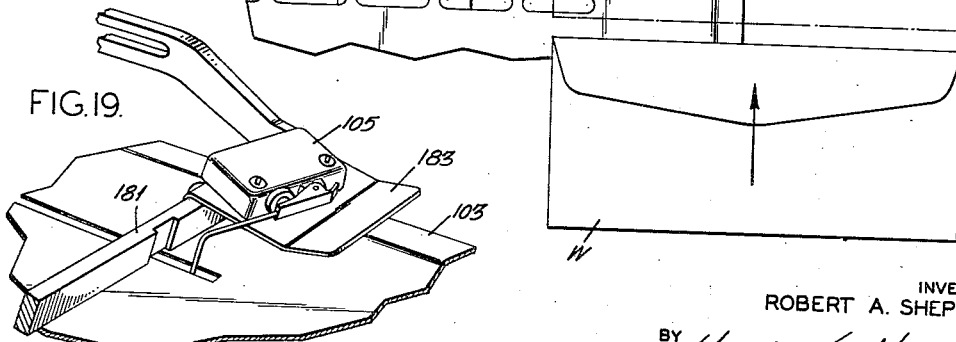

Sept. 11, 1962 R. A. SHEPHERD 3,053,176
ADDRESSING MACHINE
Filed May 25, 1959 10 Sheets-Sheet 8
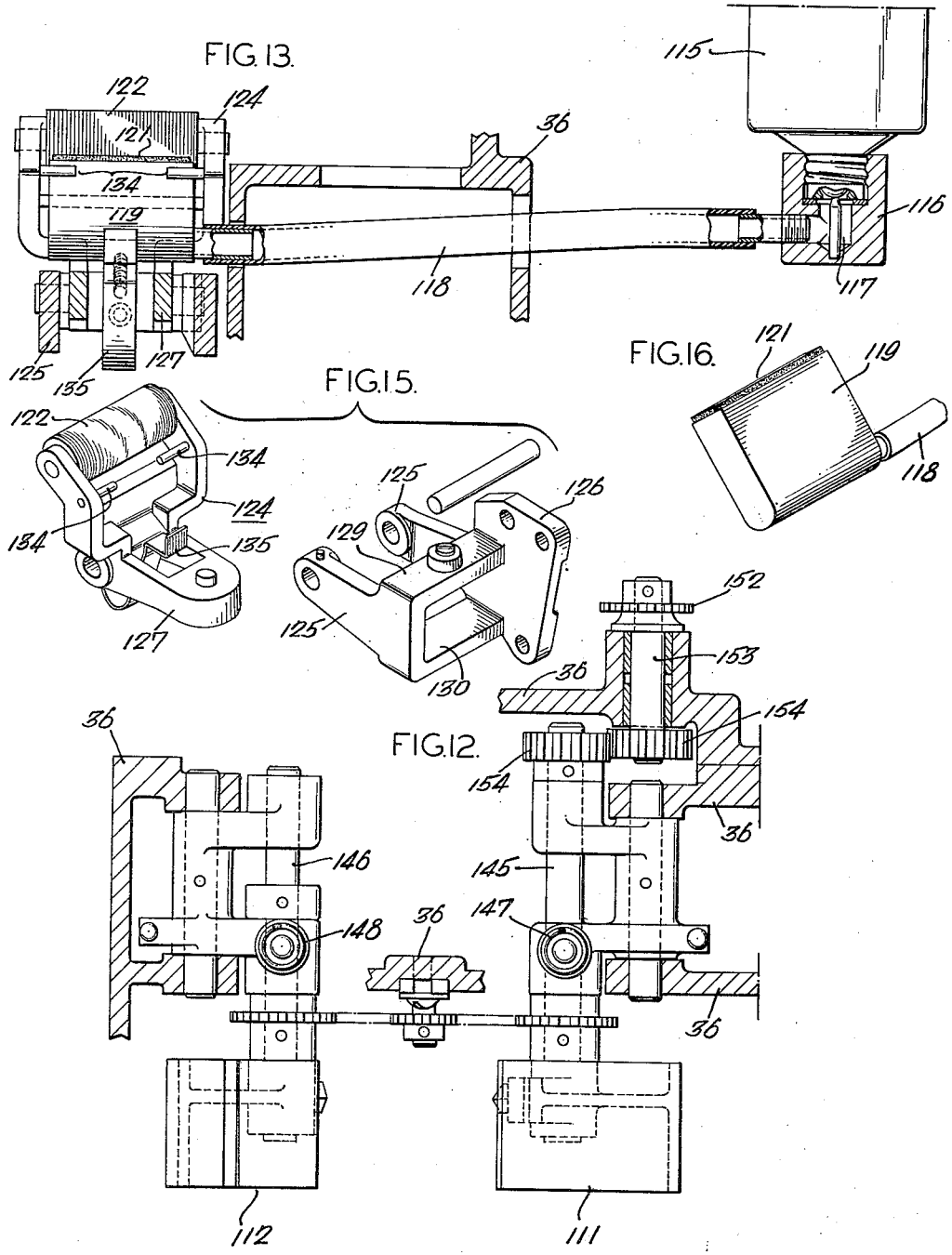
INVENTOR:
ROBERT A. SHEPHERD
BY Howson & Howson
ATTYS.

Sept. 11, 1962
R. A. SHEPHERD
3,053,176
ADDRESSING MACHINE
Filed May 25, 1959
10 Sheets-Sheet 9
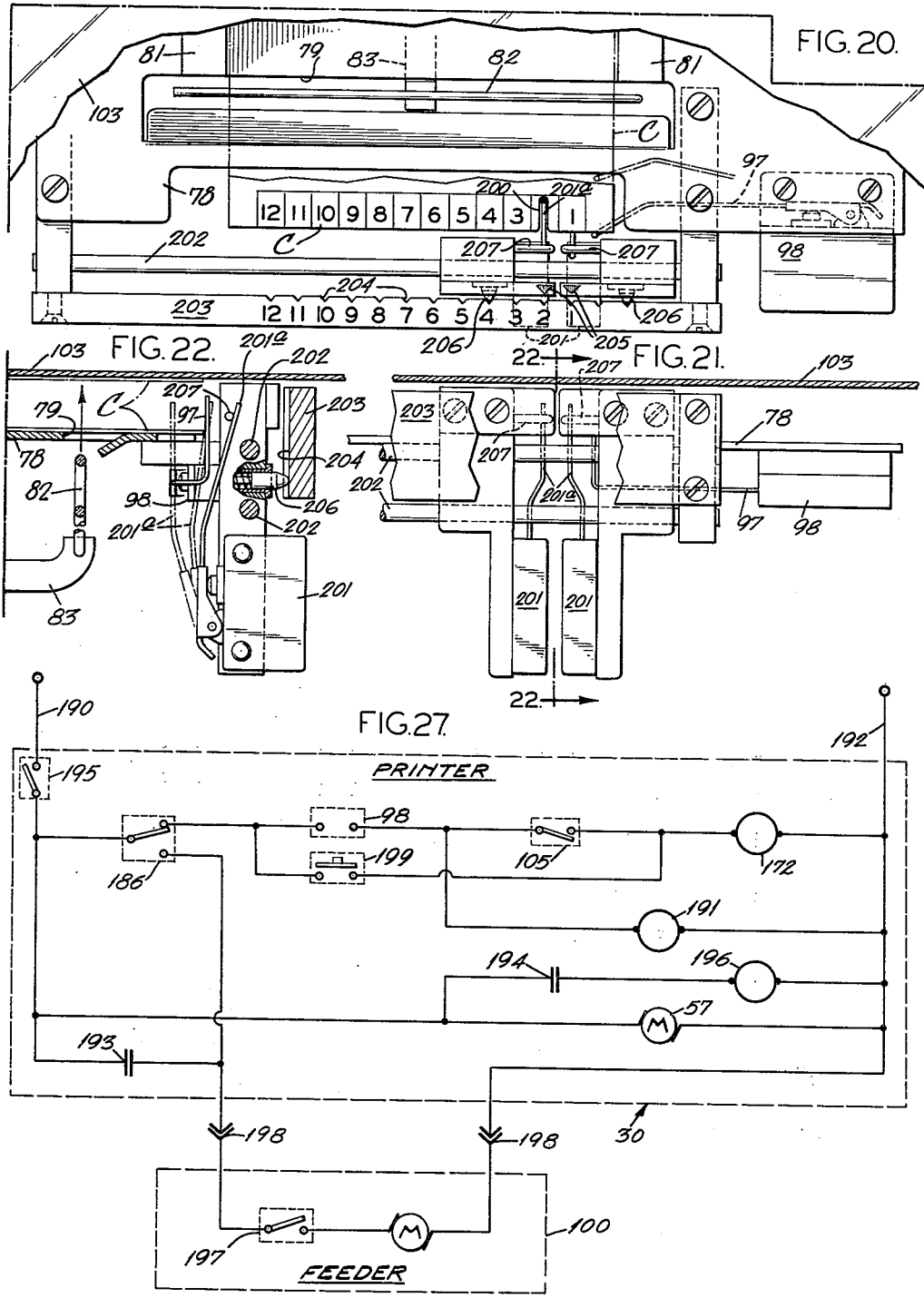
INVENTOR:
ROBERT A. SHEPHERD
BY Howson & Howson
ATTYS.

United States Patent Office 3,053,176
Patented Sept. 11, 1962

3,053,176
ADDRESSING MACHINE
Robert A. Shepherd, Montreal, Quebec, Canada, assignor to Scriptomatic, Inc., Philadelphia, Pa., a corporation of Pennsylvania
Filed May 25, 1959, Ser. No. 815,544
13 Claims. (Cl. 101—132.5)

The present invention relates to new and useful improvements in addressing machines and the like operable to duplicate on a work piece an address or other printed matter from a master card. The machine of the present invention is illustrated and described as the type that prints by the hectograph process wherein the area of the work piece to be imprinted is first moistened with a solvent, and thereafter the work piece and master card are brought into pressure-applying relationship with each other to imprint the address or other matter from the card onto the work piece.

A primary object of the present invention is to provide a compact and versatile machine of this type which may be used with either an automatic or manual feed of the work pieces, and which may carry out a variety of functions easily and quickly.

Another object of the present invention is to provide an addressing machine or the like which is arranged to quickly and accurately index master cards and work pieces, regardless of the relative size of the cards and work pieces, so that the printed matter is always applied to the work piece in a predetermined location.

Still another object of the present invention is to provide a machine of the above type wherein a series of master cards may be supplied to the machine, and the machine will automatically sort out and print selected cards, returning all of the master cards to a stack in the same order in which they were supplied to the machine.

A further object of the present invention is to provide a novel addressing machine and the like which will print material on work pieces, such as envelopes, accurately and clearly, controlling the amount of solvent applied to the work piece and the pressure on the work piece and master card during the printing operation.

A still further object of the present invention is to provide a novel machine having the features and characteristics set forth above, which is of relatively simplified construction, may be manufactured easily and cheaply, and is highly efficient and effective in operation and use.

These and other objects of the present invention and the various features and details of the operation and construction thereof are hereinafter more fully set forth and described with reference to the accompanying drawings, in which:

FIG. 1a is a schematic perspective view illustrating the path of travel followed by the master card and work pieces during passage through the machine of FIG. 1;

FIG. 6 is an enlarged rear side elevational view partially in section of the apparatus illustrated in FIG. 1;

FIG. 7 is an enlarged fragmentary sectional view taken on line 7—7, FIG. 4;

FIG. 8 is a transverse sectional view taken on line 8—8, FIG. 7;

FIG. 9 is a transverse fragmentary sectional view taken on line 9—9, FIG. 4;

FIG. 10 is a transverse view taken on line 10—10, FIG. 4 illustrating the feed slot through which the master cards are fed into the card receiving chamber;

FIG. 11 is a fragmentary sectional view of a portion of the drive mechanism, taken on line 11—11, FIG. 5;

FIG. 12 is a sectional view of a portion of the drive mechanism for the moistening and printing means taken on line 12—12, FIG. 3;

FIG. 13 is a sectional view taken on line 13—13, FIG. 5, illustrating the feed means for the moistening solvent;

FIG. 14 is a sectional view taken on line 14—14, FIG. 4, illustrating the construction of the single revolution drive clutch;

FIG. 15 is an exploded perspective view illustrating the construction and mounting of the applicator roll for applying the solvent to the moistening roll;

FIG. 16 is a perspective view of the solvent supply tank and wick;

FIG. 17 is a fragmentary plan view of a portion of the feed table illustrating the feed of a work piece;

FIG. 18 is a fragmentary plan view of a portion of the feed table arranged for manual feed of the work piece;

FIG. 19 is a perspective view of the sensing switch used in conjunction with the manual feed of the work pieces;

FIG. 20 is a plan view of the automatic switch arrangement used for automatically determining whether or not a master card is to be printed or passed by;

FIG. 21 is a front elevational view of the switch means in FIG. 20;

FIG. 22 is a transverse sectional view taken on line 22—22, FIG. 21;

FIG. 23 is a schematic side view partially in section illustrating the moistening and printing rolls at the start of a cycle of operation;

FIG. 24 is a fragmentary view of a portion of FIG. 23 illustrating the position of the moistening and printing rolls during the middle of the cycle of operation;

FIG. 25 is a view similar to FIG. 24 with the moistening and printing rolls advanced beyond the position shown in FIG. 24;

FIG. 26 is a transverse sectional view taken on line 26—26, FIG. 25;

FIG. 27 is a schematic wiring diagram of the apparatus of the present invention; and, FIG. 28 is a schematic wiring diagram similar to FIG. 27 with automatic switching and sensing means.

Figure 1:
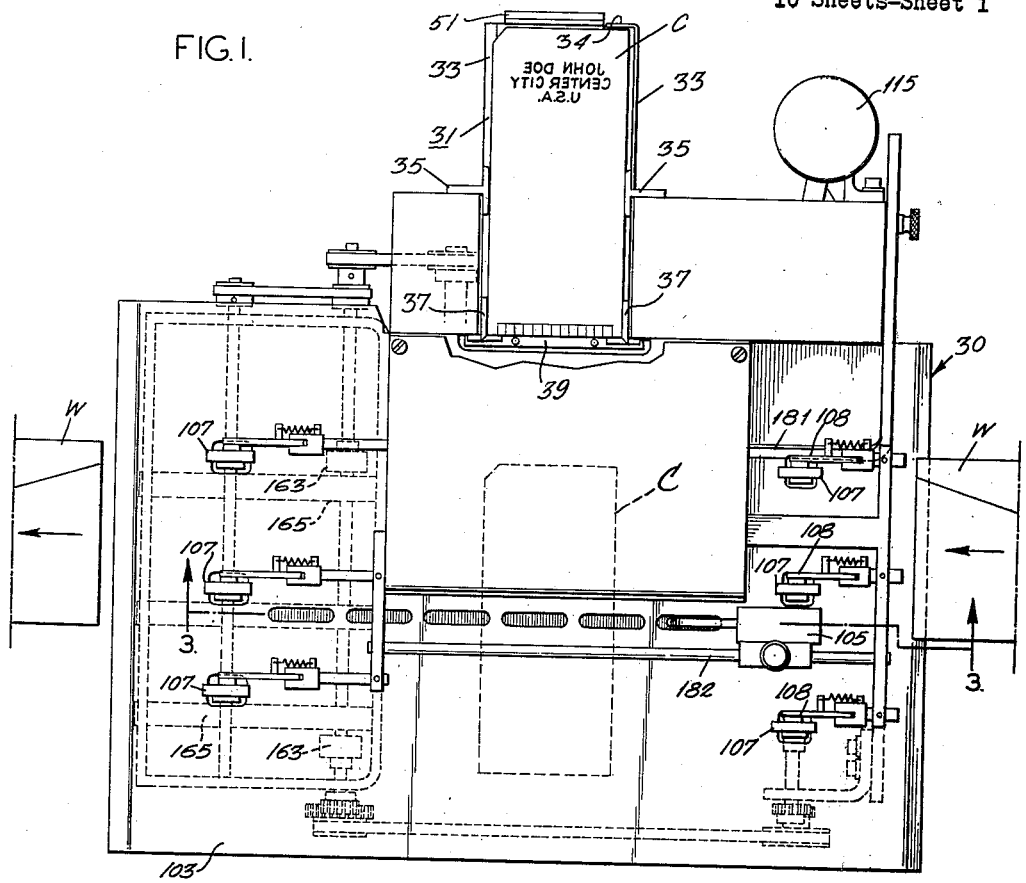
FIG. 1 is a top plan view of an addressing machine made in accordance with the present invention.
Figure 2:
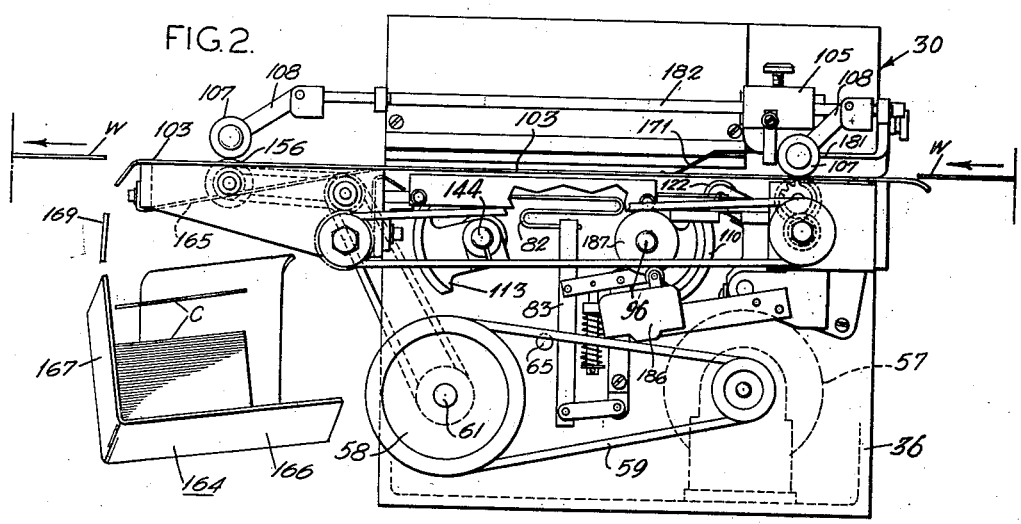
FIG. 2 is a side elevational view of the machine illustrated in FIG. 1.

Referring more specifically to the drawing, and particularly to FIGS. 1, 1a and 23 thereof, reference numeral 30 designates generally an addressing machine, or the like, embodying the present invention which is adapted to receive master cards C and work pieces W, bring the cards and workpieces into registry with one another, cause material on the cards to be copied onto the workpiece, and then discharge the cards and workpieces separately from the machine. In the illustrated embodiment of this invention the master cards C are shown as address cards, while the workpieces W are shown as envelopes, and the imprinting or transfer process is described as being a hectograph process wherein a solvent is first applied to the imprint area of the envelope with the card thereafter being brought into pressure-applying relation with the envelope to cause printing of the envelope. It is to be understood, however, that the cards and workpieces may be other than address cards and envelopes, and that the process carried out by the apparatus, other than the present invention, may be other than the conventional hectograph process for printing the workpieces. As shown in FIG. 1a, the workpieces W follow a substantially straight path longitudinally through the machine, while the master cards are fed transversely to the path of travel of the workpiece to a position below the workpiece are raised vertically upward into engagement with the workpiece during the printing operation, and then are conveyed longitudinally of the machine in the same direction as the workpiece, with the workpieces and the master cards being discharged from the machine into separate stacks, as more fully set forth hereinafter.

As illustrated in FIGS. 1, 3, 4, and 5, the master cards are supported in a vertical stack in a card magazine 31 which comprises a supporting base 32, sidewalls 33, 33, and an end wall 34. The card magazine 31 is open at the top so the cards may easily be inserted in the magazine. A pair of side guide blocks 35, 35 bolted or otherwise secured to the main frame 36 of the addressing machine, engage opposite sides of the stack of master cards C at approximately the mid-point of the side edges of the cards to position the cards transversely in the card magazine 31. A second pair of guide members 37, 37 are positioned adjacent the forward corners of the card magazine 31 in engagement with the side and forward edges of the corner portions of the cards in the magazine to maintain the stack of cards in the magazine in the desired position. The lower edge of that portion of the guide members 37, 37 in engagement with the forward edges of the cards in the magazine termintes adjacent the upper surface of card stop means 39, which engages the forward edges of the lowermost cards in the magazine 31 and opeartes to prevent the feed of more than a single card at a time from the magazine.

Figure 4:
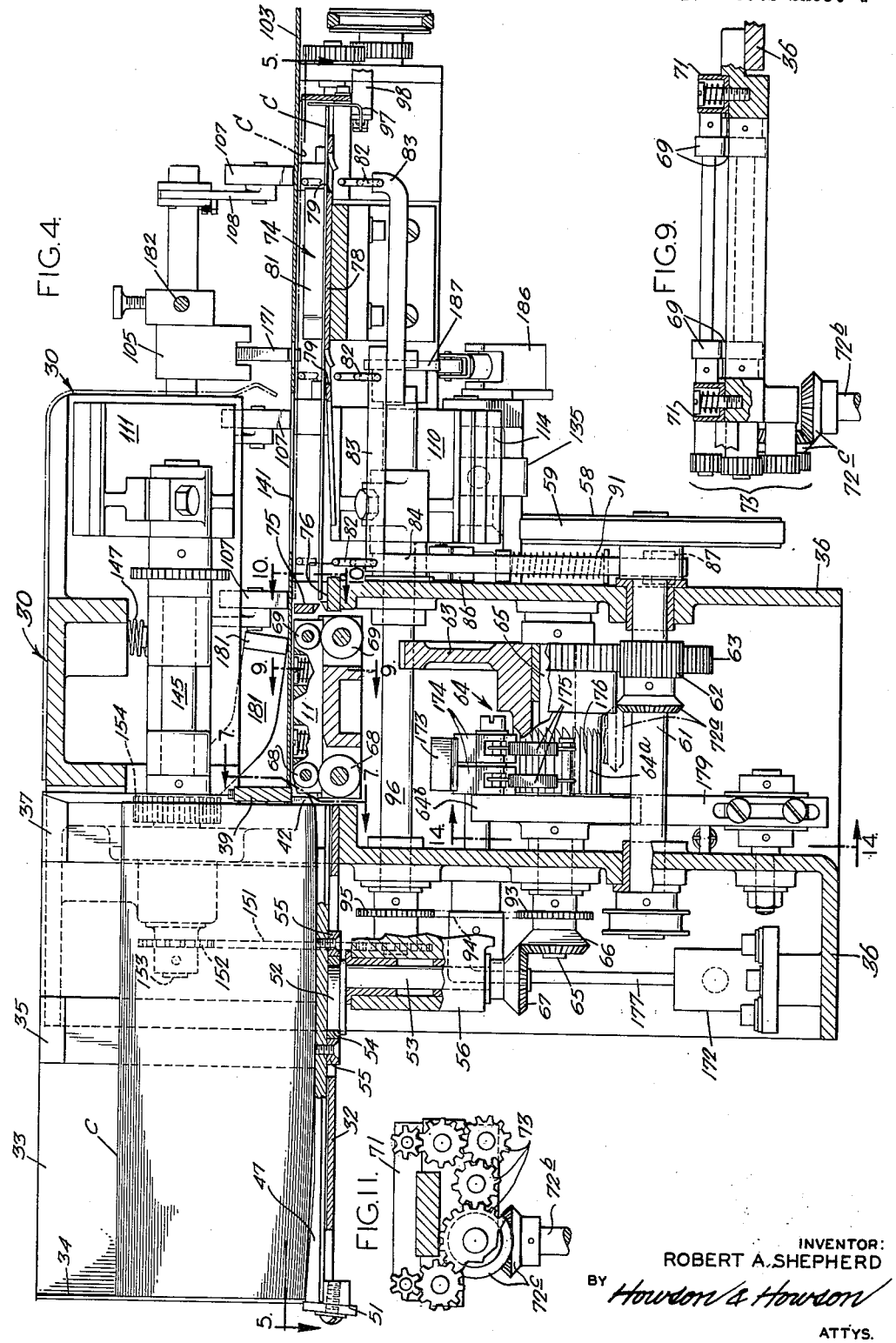
FIG. 4 is a transverse sectional view taken on line 4—4, FIG. 3.

As illustrated in FIGS. 4 and 7, the card stop means 39 comprises a supporting block 41 which is bolted or otherwise secured to the frame 36 of the machine in a position extending transversely across the forward end of the card magazine 31 adjacent the lower end of the magazine. A pair of gauge blocks 42, 42 is adjustably secured to the lower portion of the support member 41, for example, by adjusting bolts 43, 43 which project through a vertical slot in the gauge blocks and are threadedly received in the support member 41. The adjusting bolts 43, 43 permit a rough adjustment of the gauge blocks to the approximate vetrical position with respect to the card magazine so that the lower tip of the gauge block engages the second card from the bottom of the stack of cards to be discharged from the card magazine. Fine adjustment of the position of the gauge blocks is accomplished by providing a pair of slots or kerf cuts 44, 44 transversely of the support block 41, immediately above the support connection for the gauge blocks to the support bracket. A pair of adjusting setscrews 45, 45 is threaded through the upper portion of the support bracket 41 into engagement with the upper surface of that portion of the support bracket beneath the slots 44, 44, so that by threading the set screws 45, 45 downwardly, a relatively fine adjustment may be made in the position of the gauge blocks 42, 42 to accurately control the position of the gauge blocks relative to the card magazine.

In accordance with the present invention the master cards C are fed one at a time from the card magazine by engaging the rear surface of the lowermost card in the magazine, and forcing the lowermost card forwardly out of the magazine. This feed of the lowermost card is accomplished by means of a reciprocating feed plate 47 slidably mounted for reciprocating movement on the base 32 of the card magazine. The upper surface of the reciprocating feed plate for the cards is generally concave from front to rear, having a substantially flat central portion, with the front and rear portions thereof projecting upwardly at a slight angle, so that the stack of cards in the magazine is supported by the front and rear edges of the feed plate.

The feed plate 47 is shown in FIG. 4 in its fully retracted position and, in this position, the extreme forward edge of the feed plate is positioned immediately beneath the lower edge of the rear surface of the gauge box 42, 42 with the gauge blocks positioned, as set forth previously, above the upper surface of the feed plate a distance slightly greater than the thickness of a single card, and less than the thickness of two cards. In this position the weight of the forward edge of the cards is supported by the forward edge of the feed plate, so that the lowermost card in the stack of cards is forced downwardly against the forward edge of the feed plate, insuring that the lowermost card of the stack of cards will pass underneath the gauge blocks 42, 42 upon actuation of the feed plate in the forward direction. A stripper plate 51 is secured to the rear edge of the plate 47 and projects upwardly above the plate 47 a distance slightly less than the thickness of a single master card so that upon forward movement of the feed plate 47 the stripper plate 51 is caused to engage the rear edge of the lowermost card in the stack of cards, and force the lowermost card forwardly with respect to the stack of cards, while the remaining cards in the stack are held stationary by means of the brackets 37, 37 and the gauge blocks 42. As set forth previously, the rear portion of the upper surface of the reciprocating feed plate 47 extends angularly upward so that the weight of the rear portion of the cards in the stack of cards is supported by the rear edge of the lowermost card in the stack, thereby forcing the lowermost card firmly downward against the feed plate 47 and insuring that the card is engaged by the stripper plate 51 upon forward movement of the feed plate. In addition to causing a positive engagement of the lowermost card by the stripper plate, the angularly inclined portion of the reciprocating feed plate also protects the printed material on the lowermost card of the stack of cards by supporting the card in such a manner that that portion of the card containing the printed matter does not support any of the weight of the remaining cards in the stack of cards. This prevents the printed matter on the cards from being transferred to the rear side of the next adjacent card.

Reciprocating movement of the feed plate 47 is caused by means of an accentric 52, secured to a rotatable shaft 53, with the eccentric 52 being engaged within a yoke 54. The yoke is restrained from longitudinal movement relative to the feed plate 47 by means of a pair of restraining bars 55, 55 secured to the feed plate 47 in engagement with the opposite side edges of the yoke 54. The shaft 53 is journaled within a bearing carried by a boss 56 secured to the housing 36, and upon rotation of the shaft 53 the eccentric 52 causes reciprocating movement of the feed plate 47 in a longitudinal direction.

Rotation of the shaft 53 is caused by means of a main drive motor 57 for the entire addressing machine, which is connected, for example, by means of a pulley and belt 58 and 59, respectively, to a main drive shaft 61 extending transversely of the machine. A pinion 62 secured to the main drive shaft 61 in engagement with a spur gear 63 causes rotation of the drive member 64a of a conventional single-revolution clutch 64, the operation and construction thereof being more fully described hereinafter. The driven member 64b of the single revolution clutch 64 is interconnected with a stub shaft 65 which carries a bevel gear 66 positioned in meshing engagement with a second bevel gear 67 secured to the lowermost end of the eccentric shaft 53. With this construction, upon every actuation of the single-revolution clutch 64, as more fully described hereinafter, the eccentric 52 is caused to make a single revolution, thereby actuating the reciprocating feed plate 47 from its rearmost position to a forward position, and then returning the feed plate to its rearmost position.

Figure 5:
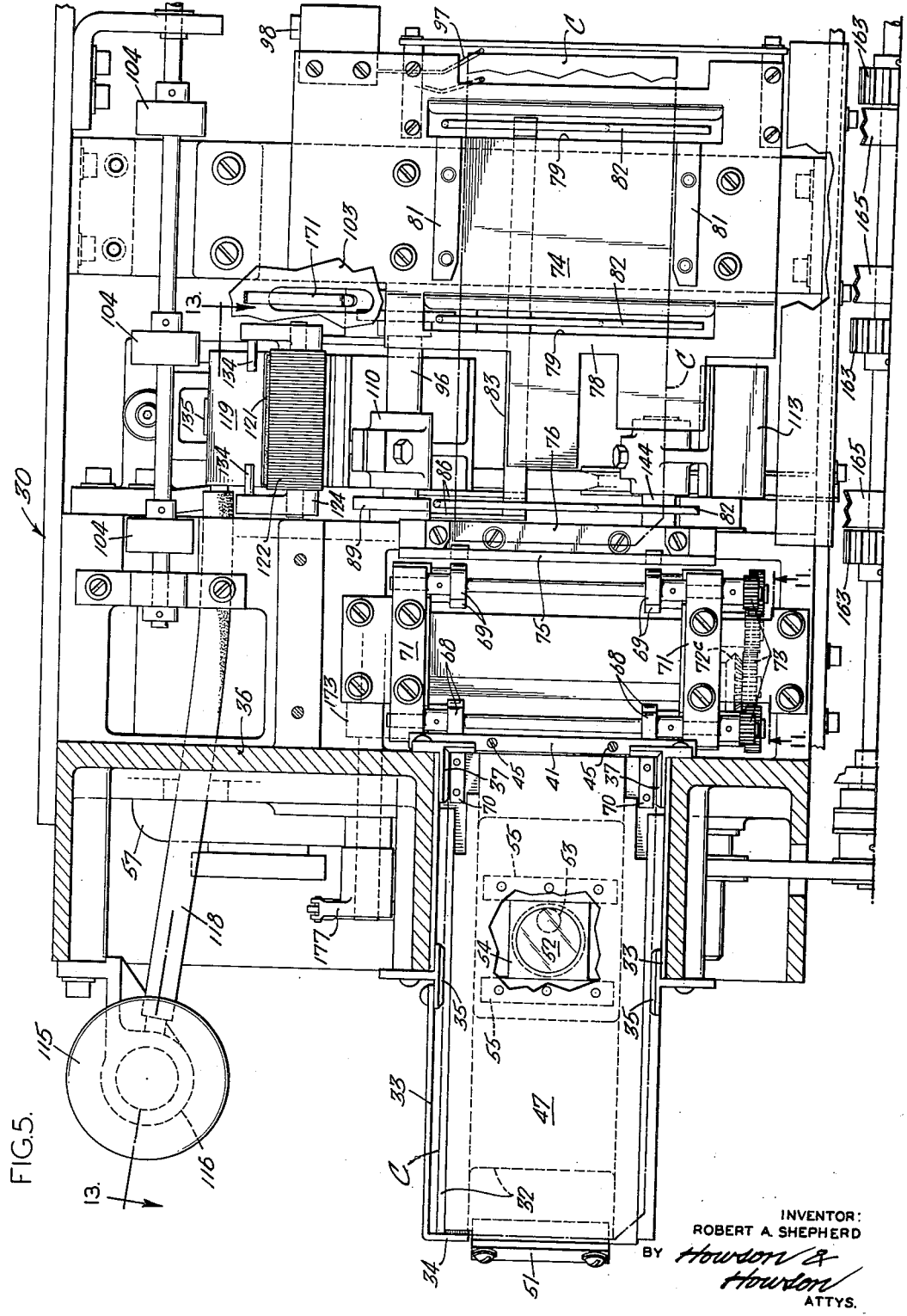
FIG. 5 is a fragmentary sectional view taken on line 5—5, FIG. 4, illustrating a portion of the card feed and work piece feed mechanism.

Each time the feed plate 47 is actuated in the forward direction it carries the lowermost card of the stack of cards in the magazine 31 forwardly to a position between the nip of two pairs of axially spaced continuously rotating feed rolls 68, 68 which engage the card and continue the forward feed of the card to a second set of two pairs of axially spaced continuously rotating feed rolls 69, 69. As illustrated in FIG. 5, the forward end of the reciprocating feed plate 47 is narrower than the master card C, and also is narrower than the distance between the pairs of feed rolls 68, 68, so that the feed plate may be actuated forwardly to position between the two pairs of feed rolls 68, 68, with the side edge portions of the cards extending outwardly beyond the side edges of the forward end of the feed plate to a position in engagement with the feed rollers 68. When the feed plate 47 is in this advanced forward position, the remaining cards of the stack of cards in the magazine are supported out of engagement with the feed plate by means of a pair of supporting blocks 70, 70, positioned adjacent opposite sides of the forward end of the card magazine. (See FIG. 7.)

Each of the upper rollers of the pairs of rollers 68, 68 and 69, 69 are carried in movable supporting bearings 71, 71, which are normally biased downwardly; for example, by means of coil springs, as shown in FIGS. 4 and 9, to maintain the rollers of each pair in pressure-applying engagement and insure a positive feed of the card. Both the upper and lower rollers of each pair of rollers are driven continuously from the main drive shaft 61 of the machine, for example, by means of a pair of bevel gears 72a, interconnecting the main drive shaft 61 with a vertically extending shaft 72b. A second pair of meshing bevel gears 72c, one of which is secured to the upper end of the shaft 72b drives the pairs of rollers 68, 68 and 69, 69 through a gear train 73, as shown in FIGS. 9 and 11.

As the card is engaged by the second set of rollers 69, 69, it is forced forwardly at a relatively rapid rate of speed through a card trap into a card-receiving chamber 74. The card trap is positioned at the entrance to the card chamber 74 and operates to permit the card to freely enter the card chamber, but prevent the cards from hitting the rear wall of the chamber and then bouncing backwardly toward the entrance to a position partially out of the chamber. As illustrated in FIGS. 4 and 10, the card trap comprises upper and lower toothed members 75 and 76 respectively, each having teeth 75a and 76a, respectively, at their opposite ends, with the teeth thereof of the upper and lower members projecting inwardly toward each other. The teeth on the upper end lower members 75 and 76 of the card trap are positioned at the extreme outer end of these members to engage solely the side edge portions of a card passing through this card trap. These teeth are staggered in the direction of travel of the card with the teeth 75a on the upper member 75 being positioned in advance of the teeth 76a on the lower member 76. The teeth are spaced apart vertically a distance less than the thickness of the card. However, the forward edges of the teeth facing the direction of travel of the card are beveled, as indicated in FIG. 4, so that the card may pass between these teeth with that portion of the card engaged by the teeth being bent at an acute angle to the direction of travel of the card. By this construction the card may be readily forced through the card trap into the card-receiving chamber 74, but may not pass out of the chamber through the card trap.

Figure 3:
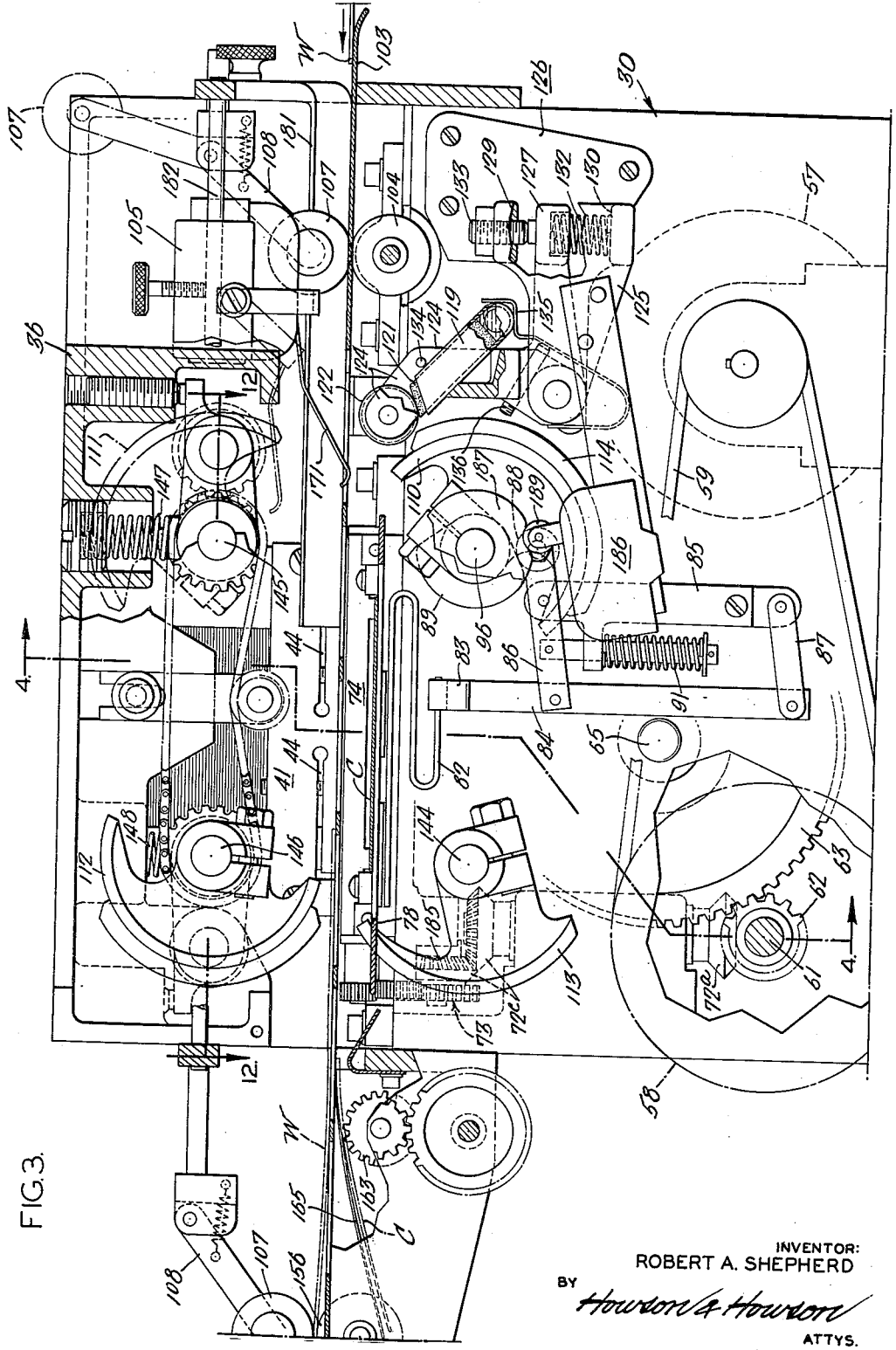
FIG. 3 is an enlarged fragmentary longitudinal sectional view taken on line 3—3, FIG. 1, illustrating the means for moistening and printing the work pieces and a portion of the drive mechanism for the apparatus of the present invention.

When the card fully enters the card chamber 74 it is guided onto and supported by a receiving table 78 which forms the lower wall of the card chamber 74. A pair of slots 79, 79 extends transversely of the receiving table 78 to a position beyond a pair of side guide members 81, 81 which position the card transversely in the card chamber. Positioned beneath the receiving table 78 is a plurality of generally Z-shaped resilient transfer wires 82, adapted to be moved upwardly in unison to elevate the card to the printing position as shown in broken line, FIG. 4. These resilient transfer wires 82 are carried by a vertically movable bracket member 83, which is adapted to be actuated vertically in timed relation to the feed of a card into the card chamber. The bracket 83 is carried by a supporting arm 84 which is secured to a bracket 85 supported on the frame of the machine by means of a pair of parallel, pivotally mounted links 86 and 87, as shown in FIG. 3, so that the arm 84 will be maintained in a vertical position and will be moved in a generally vertical path. Upward movement of the arm 84 is effected by means of a cam follower 88 positioned in engagement with an intermittently rotating cam 89, while a coil spring 91, connected to the link 86 returns the arm 84 and the transfer wires 82 to their lowermost position. Intermittent rotation of the cam 89 is caused by a drive from the driven member of the single-revolution clutch, which drive consists of a sprocket member 93 carried by the shaft 65 of the single-revolution clutch, and a chain 94, which passes over the sprocket 93 and a sprocket 95 secured to a shaft 96 mounting the cam 89. Thus, at the same time that the feed plate 47 is started on its forward movement, the cam 89 starts to rotate with the cam being so arranged with respect to the drive for the feed plate that at the start of a cycle of operation the wires 82 will move a card to the printing position, from which it will be removed as more fully described hereinafter, and then the wires will be lowered immediately before a card from the card magazine enters the card chamber.

As a card fully enters the card chamber 74, the leading edge of the card engages a switch-actuating arm 97 of a normally open run-out switch 98 thereby closing the switch, as illustrated in FIG. 5. The run-out switch 98 is in the starting circuit for the addressing machine, and when it is closed, conditions the machine for operation, as more fully described hereinafter. If no card is in the card chamber, or if a card is not fully inserted in the chamber, the machine will not start a cycle of operation.

Simultaneously upon movement of the card to the printing position a work-piece is caused to enter the addressing machine and be actuated to a printing position overlying the card. The workpiece may be fed to the machine either manually by the operator, or may be fed automatically from a feeder unit 100. The feeder 100 comprises a continuously rotating, motor-driven feed roll 101, which has a friction covering 102, extending about a portion of its periphery, operable to engage the top workpiece W of a stack of workpieces. Rotation of the feed roll forces the workpiece out of the feeder and across a work table 103 of the printing machine to a position into engagement with a continuously rotating feed roll 104. The feeder operates to continuously feed workpieces, such as envelopes, to the addressing machine of the present invention at a uniform rate of speed and with a short predetermined gap between successive workpieces.

As the workpiece is engaged by the continuously rotating feed roll 104, the feed roll forces the workpiece forwardly along the top of the work table 103 into engagement with a normally open print switch 105, engaging the switch actuating arm of the print switch and closing the switch. A spring-biased pressure wheel 107 mounted on a pivoted arm 108 engages the upper surface of the workpiece and maintains the workpiece in engagement with the feed wheel 104. When the workpiece reaches this position, the machine is then in condition to carry out the printing operation.

As set forth above, after a card is in position on the receiving table in the card chamber and an envelope or other workpiece has been fed along the work table past the printing switch, the machine is ready for the printing operation. The printing operation is carried out by the hectograph method, wherein the area of the workpiece which is to be imprinted is first moistened with a solvent, and thereafter, the material imprinted on the master card is brought into contact with the moistened area of the workpiece to cause the material imprinted on the card to be duplicated on the workpiece. To accomplish this printing operation, two pairs of rolls are used, one pair being used for the moistening operation and the other pair for the printing operation. The first pair of rolls comprises a moistening roll 110 and a hold-down roll 111, which operate to apply the solvent to the workpiece, while the second pair of rolls comprises upper and lower pressure rolls 112 and 113, respectively, which operate to bring the master card and workpiece into pressure-applying relationship to each other, to thereby duplicate printed matter from the master card onto the workpiece. The moistening roll 110 is in the form of a segmental roll with a relatively hard, moisture-absorbing pad or cover 114 thereon, which has a length in the circumferential direction of the roll equal to the width of the area desired to be moistened. The desired solvent is applied to this moistening roll from a container 115 which contains the solvent, and which is supported in an inverted position in a supporting bracket 116, secured to the frame 36 of the machine. Conventional valve means are provided in the bracket 116 to permit the solvent to flow out of the container 115 into a well 117 in the bracket 116. A flexible hose 118 carries the solvent from the well 117 to a supply tank 119, which is open at its upper end and has a wick 121 immersed in the container and projecting outwardly therefrom into engagement with a capillary-grooved applicator roll 122.

The applicator roll 122 is positioned so that it will be engaged by the moisture-absorbent surface 114 of the moistening roll 110. To accomplish this, the applicator roll is rotatably secured to a yoke 124 which in turn is pivotally carried by forwardly extending arm portions 125, 125 of a bracket member 126 mounted on the frame of the addressing machine. The yoke 124 is generally L-shaped, and has rearwardly-extending leg portion 127 thereon which is positioned between upper and lower cross arms 129 and 130, respectively, of the bracket 126. A coil spring 132 is positioned between the lower cross arm 130 and the leg 127, for example, as illustrated in FIG. 3, to force the applicator roll 122 to a forward position in a path of travel of the moistening roll 110. An adjusting bolt 133, threaded through the upper cross arm 129 into engagement with the leg 127 of the yoke 124, limits the forward movement of the applicator roll 122. The solvent tank 119 is also carried by the yoke 124, with the wick portion 121 in engagement with the applicator roll. As illustrated in FIGS. 3 and 13, the solvent tank 119 rests against the yoke beneath a pair of retaining pins 134, 134 and is resiliently urged upwardly into engagement with the applicator roll by means of a resilient leaf spring 135. An adjusting bolt 136 extending through the yoke 124 into engagement with the leaf spring 135 controls the pressure of the wick 121 against the applicator roll 122, thereby controlling the amount of solvent applied to the applicator roll by means of the wick. With this arrangement described above the amount of solvent applied to the workpiece by means of the moisture absorbent surface 114 of the moistening roll 110 may be carefully controlled by controlling the pressure of the wick against the applicator roll and the relative position of the applicator roll with respect to the moisture-absorbent surface of the moistening roll.

The printing rolls 112 and 113 also are segmental rolls having peripheral surface portions operable to engage the card and workpiece simultaneously, advance the same forwardly in unison, and exert pressure on the card and workpiece to force that portion of the card containing the printed material against the solvent moistened area of the workpiece. This duplicates on the workpiece the printed material on the card, thus completing the printing operation of the machine of the present invention. Both the moistening rolls 110 and 111 and the printing rolls 112 and 113 are actuated simultaneously and rotate in unison, so that the workpiece W is engaged by the moistening rolls 110 and 111 and moved longitudinally by the moistening rolls, during rotation thereof, to a position overlying and indexed with the master card. Thereafter, the master card and workpiece are gripped between printing rolls 112 and 113, and are fed forwardly at the same rate of speed with the imprint area of the master card in engagement with the solvent-moistened area of the workpiece, and after printing of the workpiece is completed, the workpiece and the card are directed toward the discharge end of the machine, as more fully described hereinafter, by the continued rotation of the printing rolls 112 and 113. As set forth previously, the workpiece is fed onto the top of the work table 103, while the master card is raised to a position immediately beneath the work table 103. In order to permit engagement of workpieces and master cards by the desired rolls, openings 141 and 142 are provided in the work table 103, as illustrated in FIG. 17.

Rotation of the moistening and printing rolls is accomplished by means of the driven member of the single-revolution clutch 64. The drive for these four rolls is from the sprocket member 93 secured to the shaft 65 which is rotated by the driven member of the clutch, through the chain 94 to the sprocket 95 carried on the shaft 96, and to a sprocket 143 carried on a shaft 144. The shafts 96 and 144 mount, respectively, the moistening roll 110 and the pressure roll 113 of the set of printing rolls. The upper rolls 111 and 112 of the sets of moistening and printing rolls are mounted on shafts 145 and 146, respectively, which shafts are interconnected so that they rotate simultaneously by means of a pair of sprockets and a chain, as illustrated in FIG. 6. Additionally, these shafts 145 and 146 are carried in bushings which are normally urged downwardly by means of a pair of coil springs 147 and 148 adjustably mounted in the frame portion of the addressing machine in engagement with the bushings mounting the shafts 145 and 146 so that the rolls 111 and 112 will engage against the upper surface of the work piece regardless of this thickness of the work piece. These rolls 111 and 112 are driven by means of a chain 151 passing over a sprocket on the shaft 96 engaging a sprocket 152 on a roll drive shaft 153. A pair of gears 154, 154 interconnect the shaft 153 with the shaft 145 so that the rolls 111 and 112 are driven at the same peripheral speed as the rolls 110 and 113.

As the work piece and the card pass through the printing rolls 112 and 113, the printing rolls direct the work piece and card along opposite sides of the work table 103 in a direction toward the discharge end of the addressing machine. The work piece W passes along the upper surface of the table between a pair of rotating discharge rollers 156 and then off the end of the table into an automatic stacking hopper 157. The hopper 157 comprises a bottom wall member 158 which is inclined forwardly and tilted to one side as illustrated in FIG. 23 so that all of the work pieces are stacked neatly in a pile leaning toward the forward wall 159 of the hopper and the side wall 160 of the hopper. With this construction, as the work pieces leave the work table 103 they are projected against a stationary strike plate 161 and then dropped vertically downward on the top of the stack of work pieces carried in the hopper 157, and due to the inclination of the bottom wall of the stacker, the work piece will slide to a position in engagement with the forward and side walls, thereby neatly stacking all of the work pieces. In a similar manner the master card is projected over a rotating soft-rubber covered discharge roll 163 into a card-stacking hopper 164. A resilient leaf spring 165 overlying the roll 163 and extending angularly upward above the roll 163 toward the lower surface of the work table 103 directs the discharged card over and into engagement with the roll 163. The card-stacking hopper 164 is constructed in a manner similar to the work-piece-stacking hopper 157, and comprises a base 166, a front wall 167 and a side wall 168 with the base inclined in a forward direction and tilted in a direction toward the sidewall 168, so that after the cards engage a strike plate 169 positioned above the hopper they are dropped vertically downward and are automatically stacked in a neat pile adjacent the forward and side walls of the card stacking hopper 164.

Actuation of the moistening and printing rolls is accomplished by means of the print switch 105 which is mounted above the surface of the work table 103 and has a switch-actuating arm 171 thereon, projecting downwardly toward the surface of the work table. After a work piece is engaged between the feed rolls 104 and 107 and is driven forward by these rolls the work piece engages the switch-actuating arm 171 of the print switch 105, thereby closing the switch. The print switch 105 is positioned in series with the card run-out switch 98, and when both of these switches are closed a circuit is completed, as more fully described hereinafter, to momentarily energize a clutch solenoid 172. Upon energization of the solenoid 172, a latch member 173 is drawn out of engagement with the upwardly extending lug portions of a pair of clutch pawls 174, 174 which are pivotally mounted to a driven member of the single-revolution clutch 64. A pair of spring members 175, 175 then draw the pawls 174, 174 downwardly into engagement with a ratchet 176 carried by the drive member of the single revolution clutch 64, thereby causing rotation of the driven member of the clutch. The latch member 173 is interconnected with the solenoid 172 by means of a pivoted arm 177 which has one end thereof interconnected with the solenoid 172 as illustrated in FIGS. 4 and 6. The arm is normally biased to a position wherein the latch member 173 is in the path of travel of the upwardly extending lug portions of the pawls 174, 174 and after the solenoid 172 is de-energized, which will occur either as soon as the card is removed from the card chamber, or as soon as the work piece is brought out of engagement with the print switch 105, the latch member will be forced downwardly into the path of travel of the pawls, so that upon the completion of a single revolution of the clutch, the pawls engage the latch member 173 and are drawn out of engagement with the ratchet 176, thereby stopping revolution of the driven member of the clutch. If desired, a spring-biased stop member 179 may be provided, as illustrated in FIG. 14, to prevent the single-revolution clutch from bouncing backwardly in the reverse direction.

As set forth previously, the apparatus of the present invention may be used either with the automatic feeder 100 or with a manual feed of the work pieces. When the automatic feeder 100 is used the machine is set up as shown in FIGS. 1, 17 and 23 of the drawings, with a guide member 181 adjustably secured to the workpiece feed side of the machine, as illustrated in FIG. 1, in position to engage one side of the work piece and direct the work piece along the desired path. The print switch 105 is adjustably secured to a supporting rod 182 at a point spaced from the guide member 181 so that the forward edge of the work piece engages the switch-actuating member 171 during its path of travel from the automatic feeder 100. If it is desired to use the machine of the present invention without the feeder, the feeder is either shut off by means of a manual on-switch, or is removed completely from the machine, and the print switch 105 is secured to a plate member 183, carried by the guide member 181, as illustrated in FIGS. 18 and 19, so that the work pieces may be fed manually into the machine in a direction at right angles to the direction of feed by the automatic feeder unit 100 into engagement with the switch-actuating arm of the switch 105 and against the guide member 181. Regardless of the type of feed used, as soon as the print switch 105 is actuated to its closed position and when the run-out switch 98 is closed, the single-revolution clutch will be energized thereby carrying out the moistening and printing operation as described previously.

With this above-described construction, the feed of the master card, elevation of the master card, and the moistening and printing operation are all carried out in controlled timed sequence, all being actuated by the single revolution clutch 64. At the start of a cycle of operation of the machine, a master card is in the card chamber 74 with the elevating wires 82 in their lowermost position and the run-out switch 98 closed. The various elements of the machine at the start of a single cycle of operation are in the position as shown in FIG. 23. When a workpiece engages the switch-actuating arm of the printing switch 105 closing the switch, the single-revolution clutch starts one revolution. This starts rotation of the moistening and printing rolls in the direction shown, and also elevates the card in the card chamber to a position immediately beneath the work table 103, as shown in FIG. 24. In this position of the machine the moistening rolls 110 and 111 have already engaged the workpiece and are feeding the workpiece forwardly over the top of the master card. Continued rotation of the single revolution clutch causes the printing rolls 112 and 113 to engage both the master card and the work piece, as shown in FIG. 25, thereby printing the work piece.

The machine is so timed that upon engagement of the master card by the printing rolls, the elevating wires 82 are lowered, and as the elevating wires are lowered the next master card is fed into the card chamber from the card magazine. The printing rolls are still in engagement with the first master card being printed while the next master card is being fed into the magazine and this master card comes beneath the lower printing roll 113, passing within the cut-out segment 185 of the roll 113 and illustrated in FIG. 25. After the printing rolls are disengaged from the master card and work piece and are returned to their original position, as illustrated in FIG. 23, the cycle of operation of the machine is completed and the machine is ready to start a second cycle.

A cycling switch 186 is provided, which is actuated to a predetermined position at the end of the cycle of operation thereby indicating the end of the cycle and setting the machine for the start of a second cycle. The cycling switch 186 is actuated by means of a cam 187 secured to the shaft 96, which mounts the moistening roll 110 and the elevating wire actuating cam 89. This cam 187 has a single indentation, as shown, into which a cam follower 189, carried by the cycling switch 186, falls at the end of a cycle of the machine.

FIG. 27 is a schematic wiring diagram illustrating the controls for an addressing machine made in accordance with the present invention. At the end of a complete cycle of the machine the cycling switch 186, which is a single pole, double throw-switch, is in the position as illustrated in FIG. 27, completing a circuit through a pair of contacts in series with the run-out switch 98 and the print switch 105. When the run-out switch 98 is closed by means of a card completely entering the card chamber 74, a circuit is completed from one side of the line 190 through the cycling switch and run-out switch to a relay 191 and then to the other side of the line 192. The relay 191 has a pair of relay contacts 193 and 194 so that when relay 191 is energized the relay contacts 193 and 194 are closed. Closing the relay contacts 193 completes a circuit from one side of the line 190 through the relay contacts 193, and then to the motor of the automatic feeder 100. This causes the feeder unit to feed a workpiece onto the work table 103, thereby closing the print switch 105. Upon closing of the print switch 105, a circuit is completed to the clutch solenoid 172 through the print switch 105, the run-out switch 98 and the cycling switch 186, thus energizing the clutch solenoid and starting one revolution of the clutch. As one revolution of the clutch is started, the cycling switch 186 is immediately thrown from the position shown to its lowermost position, completing a circuit through a second pair of contacts directly to the automatic feeder 100. Thus, when the run-out switch 98 is opened by virtue of the card being removed from the card chamber 74 and the relay 191 is de-energized, operation of the feeder will not be stopped. It will be noted that the drive motor 57 is positioned directly across the line, and as long as the manual switch 195 for the addressing machine is closed the motor will continue to rotate. If desired, a counter 196 may be provided which is actuated, one unit at a time, each time the relay contact 194 is closed, thereby giving the operator of the machine an indication of the number of units printed.

If it is not desired to use the automatic feeder 100, a manual switch 197, positioned in the circuit for the feed motor, may be opened, or the feeder may be completely removed from the machine by opening the plug connections 198, 198. A manually-operated trip switch 199 is provided in the circuit by-passing the run-out switch 98 and print switch 105. This manually operated trip switch 199 is provided for the purpose of bringing a master card into the card chamber when the machine is initially started. It will be observed that upon initial operation of the machine there will be no master card in the card chamber, so that the run-out switch 98 will be open, and thus a cycle of the machine will not be able to start. By momentarily closing the trip switch 199, the clutch solenoid will be energized, which will carry the machine through one complete cycle of operation, bringing a master card into the card chamber and preparing the machine for the printing operation.

In accordance with the present invention, the machine may also be set up and used to print only selected master cards. If it is desired to use the machine in this manner, sensing mechanism, as illustrated in FIGS. 20, 21 and 22 is added to the rear end of the card chamber 74, substituting this mechanism for the plate which forms the rear wall of the card chamber. The master cards are provided with a series of index blocks, as illustrated in FIGS. 1 and 20, at the end of the card which initially enters the card chamber. These index blocks at the end of the master card may be notched or indexed, for example, as indicated at 200 in FIG. 20, and the machine may readily be set, as more fully described hereinafter, to either print all master cards which are notched in one or more predetermined places or to bypass and not print all master cards which are notched at one or more predetermined places.

To accomplish this a series of sensing switches 201 is provided, in the present instance two sensing switches 201 being shown, with the sensing switches being slidably mounted on an adjusting rod 202 extending transversely of the rear end of the card chamber 74. An index bar 203 having a series of detent grooves or notches 204 therein is provided in spaced, parallel relation to the adjusting rod 202 and may be used to adjust the sensing switches to the desired position. For example, as shown in the drawings, a notch 200 is provided in the number 2 position of the index at the feed end of the master card M and the one sensing switch 201 is positioned with a marker 205 adjacent the index number 2 on the index bar 203, so that when the card is in its fully entered position in the card chamber, a switch actuating arm 201a for the sensing switch 201 is positioned within the notch 200 on the card. The switch-actuating arm 201a thus will actuate the switch 201 to a predetermined position depending on whether the switch actuating arm is contacted by a master card or is engaged within a notch 200 on a master card. A spring-loaded detent 206, carried by the switch 201 is adapted to be received within the slots 204 to maintain the switch 201 in the set position. If a switch is not being used, the switch-actuating arm may be positioned behind a holding pin 207 on the switch, for example, as illustrated in FIG. 22, so that the switch is always maintained in a predetermined position, and will not be affected by the entry of a card into the card chamber.

Figure 28:
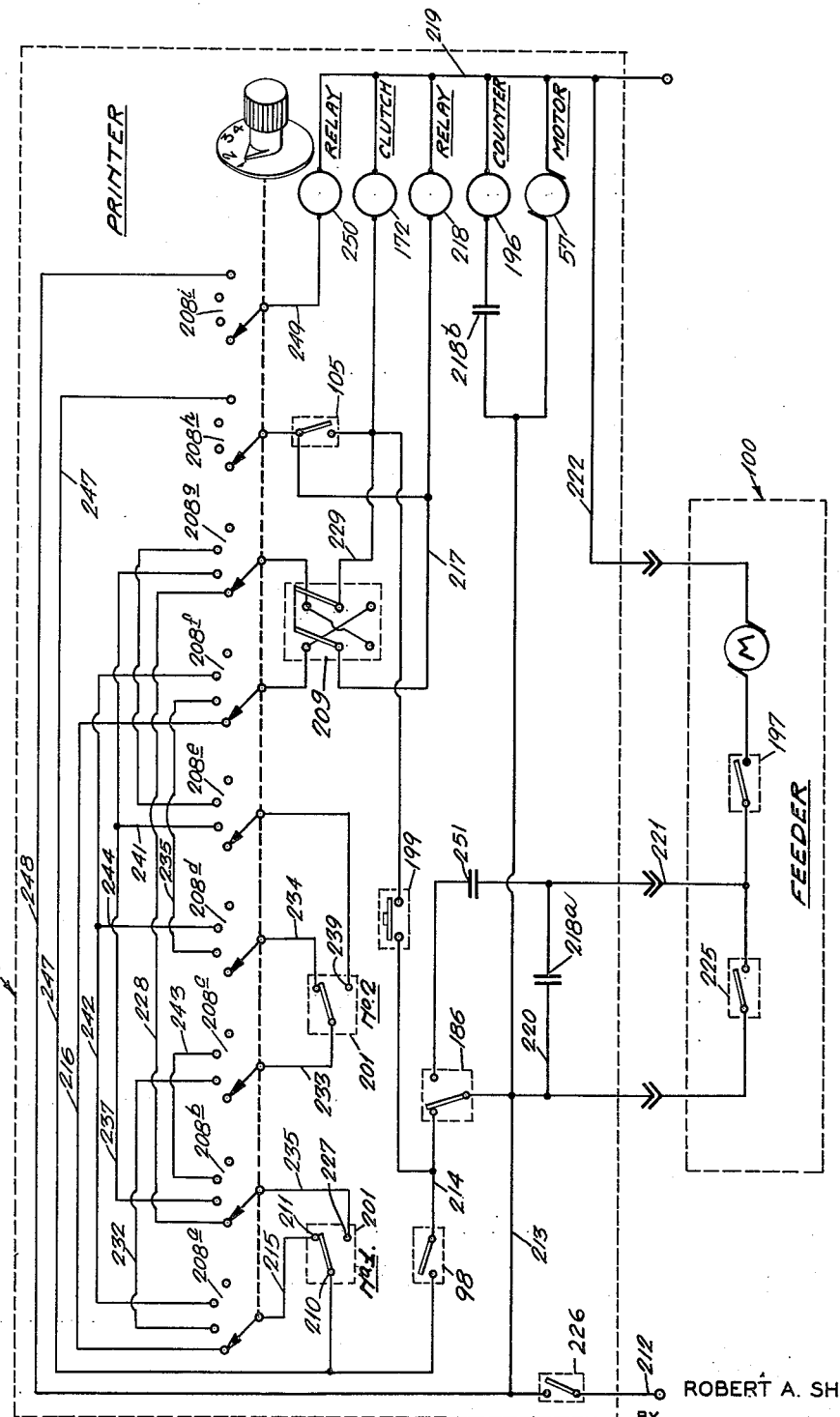

FIG. 28 is a schematic wiring diagram of the addressing machine of the present invention as used with the sensing switches, together with a selector switch 208 which may be set to any one of a number of positions to cause the machine to carry out certain operations, and a reversing switch 209 to cause the machine to either print or skip selected cards. The selector switch 208 comprises a plurality of selector switch elements 208a to 208i, inclusive, all actuable simultaneously by rotation of the switch knob. In this embodiment two sensing switches are provided with the first sensing switch 201 being marked number 1 and the second sensing switch 201 being marked as number 2. The selector switch 208 has four positions thereon, position number 1 being operable to cause the machine to either print or skip the master cards if the sensing switch number 1 is actuated; position number 2 being operable to cause the addressing machine to skip or print the master cards if both sensing switches number 1 and number 2 are actuated; position 3 being operable to cause the addressing machine to print or skip master cards if either of the sensing switches is actuated; and position 4 being operable to cause the addressing machine to print all of the cards, regardless of the contacting of the sensing switches 201. The reversing switch 209 will determine whether or not the machine prints or skips when the sensing switches are actuated.

When the reversing switch 209 is in the "up" position, as shown in FIG. 28, so that a circuit is completed between the two upper contacts and the two central contacts, the machine will print cards when the sensing switches are engaged within a card notch. Alternatively, when the reversing switch 209 is in the "down" position with the circuit completed between the two lower contacts and the two central contacts, then the machine will skip, or not print, the cards when the sensing switches are engaged within a card notch. With the selector switch in the number 1 position, the contact for each of the nine single pole switches controlled by the selector switch knob will be at the position indicated in FIG. 28, that is, with a circuit completed from the central contact of the switches to the first or left-hand contact of each of the switches. In this position of the selector switch and with only the number 1 sensing switch 201 used, when a card is inserted into the card chamber with a notch positioned adjacent the switch-actuating arm 201a of the sensing switch 201, the switch contact will be in the position shown in FIG. 28, and a circuit will be completed from the central contact 210 of the switch through the upper contact 211. Thus a circuit will be completed from one side of the line 212 through the manually operated control switch 226 of the machine, the lead line 213, the cycle switch 186, the lead line 214 through the run-out switch 98, and then through the contacts 210 and 211 of the number 1 sensing switch 201 to the lead line 215, and through the first contact of the selector switch 208a. The circuit will then be through the lead line 216, the first contact of the selector switch 208f, the reversing switch 209, and the lead line 217 to the relay 218 and the other side of the line 219. When the relay 218 is energized, a pair of relay contacts 218a and 218b are closed, the contact 218b completing a circuit through the counter 196 to actuate the counter. Upon completion of a circuit through the relay contact 218a a circuit is completed to the feeder to actuate the feeder and cause a work piece to be fed to the machine. The circuit for the feeder will be from one side of the line 212 through the lead line 213, lead line 220, the relay contact 218a, the lead line 221, the manual switch 197 for the feeder, and then through the feeder motor and the lead line 222 to the other side of the line 219. This energizes the motor for the automatic feeder 100, and upon operation of the motor a cam 223 is removed from engagement with the switch-actuating arm 224 of a normally closed cycling switch 225, as illustrated in FIG. 23. Upon release of the switch-actuating arm 224 by the cam 223 the cycling switch 225 is closed, so that a circuit through the motor for the automatic feeder 100 is completed after the relay contact 218a is opened. When the automatic feeder feeds a workpiece into engagement with the print switch 105, the printing switch is closed, thereby completing a circuit to the clutch solenoid 172 which causes one revolution of the single revolution clutch. Upon rotation of the clutch, the machine is caused to go through its normal cycle as set forth previously.

If the number 1 sensing switch 201 is engaged by the card instead of entering the slot of the card, the switch will be actuated to the position wherein a circuit is completed through the lower contact 227. This will actuate the clutch without actuating the relay 218, so that the single revolution clutch will cause the machine to go through its cycle, discharging the card from the card chamber, but the automatic feeder will not feed a work piece through the machine. Thus, a work piece will not be printed with this card. The circuit in this instance will be from one side of the line 212 through the cycling switch 186, run-out switch 98 and through the lower contact 227 of the number one sensing switch. The circuit will then be completed through the first contact of the second selector switch 208b, the lead line 228, the first contact of the selector switch 208g, the reversing switch 209, the lead line 229, and then through the clutch solenoid 172 to the other side of the line 219.

If the reversing switch 209 were thrown so that the circuit was completed through the lower switch contacts instead of the upper contacts, the operation of the machine would be just the opposite, and the machine would skip, or not print, a card when the switch-actuating arm of the sensing switch was engaged in a notch, but would print a card when the switch-actuating arm was not engaged in a notch but was moved rearwardly by engagement with the edge of the card.

When the selector switch is in the number 2 position, with contact made through the second contact points from the left of each of the selector switch elements 208a through i inclusive, the switch-actuating arms of both of the sensing switches 201, 201 must be engaged within notches in the front end of the cards in order for the machine to print or skip, depending upon the position of the reversing switch 209. If either of the switch-actuating arms of the number 1 or number 2 sensing switches 201, 201 is not engaged within a notch at the forward end of the card in the card chamber, then the machine will skip the card if the reversing switch is in the up, or print, position and will print the card if the reversing switch is in the lower, or skip, position. It will be seen that if both of the sensing switches 201, 201 are in the position as shown, with a circuit completed through the upper contact 211 of the number 1 sensing switch 201 and a circuit completed through the upper contact 231 of the number 2 sensing switch 201, which will be the position of the switches when the actuating arms of these switches are engaged within notches in the forward end of the cards, that a circuit will be completed from the upper contact 211 of the number 1 sensing switch 201, the second contact from the left of the selector switch element 208a, the lead line 232 to the second contact from the left of the selector switch element 208c, the lead line 233 and through the upper switch contact 231 of the number 2 sensing switch, and the lead line 234. The circuit will then be completed through the second contact from the left of the selector switch element 208d, the lead line 235, the second contact from the left of the switch element 208f, and then through the reversing switch 209. After this circuit is completed, the operation of the machine will be as previously described, with the machine either printing or skipping, depending upon the position of the reversing switch.

Alternatively, if, for example, the number 1 sensing switch 208 is not engaged within a notch in the forward end of the card, then the circuit will be completed through the lower switch contact 227 of the number 1 sensing switch 201, through the lead line 235 through the second contact from the left of the selector switch element 208b, the lead line 237, and through the second switch contact from the left of the selector switch element 208g, and then to the opposite side of the reverse switch 209. The operation of the machine and the circuit will be as set forth previously, with merely the solenoid 172 for the single revolution clutch being energized if the reversing switch is in the "up" or print position so that the machine will skip. Also, if the number 1 selector switch 201 is engaged within a notch of the card, but the number 2 sensing switch 201 is not engaged with a notch of the card, then a circuit will be completed through the lower switch contact 239, and then through the lead line 240, through the second switch contact from the left of the selector switch element 208e through the lead line 241, and then to the line 237 and through the selector switch element 208g as previously described.

When the selector switch is in the number 3 position the machine will skip or print, according to the position of the reversing switch 209, when either of the sensing switches 201, 201 has its switch-actuating arm engaged within a notch of the card. It will be seen in this position of the switch that if, for example, the switch actuating arm of the number 1 selector switch 201 is engaged within the notch of a card, and the switch-actuator arm of the number 2 sensing switch 201 is not engaged within the notch of the card, that a circuit will be completed through the number 1 sensing switch, the third contact from the left of the selector switch element 208a, the lead line 242, and then through the third contact from the left of the selector switch element 208f to the reversing switch 209. Alternatively, if the number 1 sensing switch-actuating arm is not engaged within the notch of the card, but the actuating arm for the number 2 sensing switch is engaged within the notch of the card, then the circuit will be completed through the lower contact 227 of the number 1 sensing switch, the third contact from the left of the selector switch element 208b, the lead line 243 through the third contact from the left of the selector switch element 208c, the number 2 sensing switch 201, through the third contact from the left of the selector switch element 208d, the lead line 242, and then through the third contact from the left of the selector switch element 208f to the upper contact of the reversing switch 209. If neither of the switch actuating arms of the sensing switches 201, 201 is engaged within a notch in the card, then the circuit for the machine in the number 3 position of the selector switch will be through the lower contact 227 of the number 1 sensing switch, the third contact from the left of the selector switch element 208b, the lead line 243, the third contact from the left of the selector switch element 208c, the lower contact 239 of the number 2 sensing switch 201, the lead line 240, the third contact from the left of the selector switch element 208e, and the third contact from the left of the selector switch element 208g to the other side of the reversing switch 209, so that the machine will operate as set forth previously, and will skip the card if the reversing switch is set for the print position, or will print the card if the reversing switch is set for the skip position.

With the selector switch set at the number 4 position, the machine will print all of the cards regardless of the position of the sensing switches 201, 201. In this position of the selector switch the circuit for the machine will be from one side of the line 212 through the cycle switch 186, the run-out switch 98, and then through the lead line 247 to the fourth contact from the left of the selector switch element 208h, through the print switch 105 to the solenoid 172 of the single revolution clutch. At the same time a circuit will also be completed from one side of the line 212 through the lead line 248 through the fourth contact from the left of the selector switch element 208i, through the lead line 249 to the coil of the relay 250, which will cause the relay contact 251 to be closed so that a circuit will be completed through the relay contact 251 to the automatic feeder, causing the feeder to feed a work piece to the machine. Thus, regardless of the position of either of the sensing switches 201, 201, the machine will print all of the cards fed thereto.

From the foregoing it will be observed that the present invention provides a novel addressing machine which is both extremely compact and versatile, and which may be set to perform a variety of functions.

While particular embodiments of the present invention have been illustrated and described herein, it is not intended to limit the invention to such a disclosure, and changes and modifications may be incorporated and embodied therein within the scope of the following claims.

I claim:

1. Apparatus for duplicating printed material from a master card to a workpiece comprising; means to feed a workpiece along a straight path in a first predetermined plane, means to feed a master card along a path in second predetermined plane parallel to said first plane and spaced from said first plane, transfer means operable to move said master card perpendicularly to said second plane to a predetermined position adjacent said workpiece, and a pair of opposed rotatable rolls operable to engage said master card and work piece at said predetermined position and feed said master card and work piece simultaneously along a predetermined path and simultaneously force said master card and workpiece into pressure applying engagement at said predetermined position to duplicate printed material from said card onto said workpiece.

2. Apparatus for duplicating printed material from a master card to a workpiece comprising; a work table, means to feed a workpiece along said work table in a straight path, a card chamber positioned beneath said work table, means to feed a master card along a path extending angularly to the path of travel of said workpiece to a position within said card chamber, transfer means operable to engage the master card positioned within said card chamber and elevate said card to a predetermined position adjacent said work table, and a pair of opposed rotatable rolls operable to engage said master card and work piece at said predetermined position and feed said master card and work piece simultaneously along a predetermined path and simultaneously force said card and workpiece into pressure applying engagement at said predetermined position to duplicate said printed material from said card onto said workpiece.

3. Apparatus for duplicating printed material from a master card to a work piece comprising; a work table, means to feed a work piece along said work table in a stright path, a card chamber positioned beneath said work table, means to feed a master card along a path extending angularly to the path of travel of said work piece to a position within said card chamber, transfer means operable to engage the master card positioned within said card chamber and elevate said card to a predetermined position adjacent said work table, pressure applying means operable to bring said card and work piece into pressure applying engagement at said predetermined position to duplicate said printed material from said card onto said work piece, first switch means positioned within said card chamber operable to be actuated to a closed position upon engagement by a card in said card chamber, second switch means provided adjacent said work table operable to be engaged by a work piece moved along said work table and actuated to a closed circuit position, drive means operable to drive said means to feed said work piece, said means to feed said master card and said transfer means to elevate said master card, said first and second switch means being operable upon actuation to said closed circuit position to energize said drive means and cause operation of said drive means.

4. Apparatus in accordance with claim 3 wherein said transfer means comprises a plurality of resilient wire members operable to engage said master card in said chamber and move said master card upwardly from said chamber to a position adjacent said table.

5. Apparatus in accordance with claim 4 wherein means are provided defining an opening to said card chamber through which said cards are fed from said magazine to said chamber.

6. Apparatus in accordance with claim 4 wherein the feed means to feed cards from said magazine comprises a sliding plate operable to engage the bottom card in said magazine and force said card longitudinally out of said magazine.

7. Apparatus in accordance with claim 6 wherein the forward and rear portions of said sliding plate are inclined angularly upward to engage the forward and rear portions of said master card.

8. Apparatus in accordance with claim 5 wherein a card trap is provided in said opening operable to permit a card to readily pass through said opening into said chamber but engage a card and prevent said card from passing in the opposite direction out of said chamber through said opening.

9. Apparatus in accordance with claim 8 wherein said card trap comprises a plurality of staggered tooth members operable to engage opposite side edges of said card passing through said opening with the surface of said teeth facing the direction of travel of said card inclined in a direction toward said card chamber.

10. Apparatus for duplicating printed material from a master card to a workpiece comprising; means to feed a workpiece along a straight path in a predetermined plane, means to feed a master card along a path extending angularly to the path of travel of said workpiece through a predetermined position spaced from the path of travel of said workpiece in a direction normal to said plane, transfer means operable to cause lateral movement of said card in said direction normal to said plane to a position adjacent said path of travel of said workpiece, indexing means on said master card, and sensing means positioned in the path of travel of said master card operable to be actuated by said indexing means, said sensing means being operable to control the feed of said workpiece.

11. Apparatus in accordance with claim 10 wherein the indexing means on said master card comprises a series of index blocks adjacent one end of said card operable to be selectively notched, and the sensing means comprises at least one switch member having a switch actuating arm positioned for engagement by said one end of said master card.

12. Apparatus in accordance with claim 11 wherein the means to feed said workpiece comprises an electric circuit including said switch member, said switch member being operable to prevent actuation of said feed means upon engagement of the switch actuating arm by said master card.

13. Apparatus for duplicating printed material from a master card to a work piece comprising; a work table along which the work piece is adapted to pass, means defining an opening in said table, first feed means operable to feed said work piece along said work table adjacent one surface thereof to a position overlying said opening, second feed means operable to feed said master card along the opposite surface of said table from the feed of said work piece to a position spaced from said table, transfer means operable to engage said master card and move said master card perpendicular to said table to a position adjacent said opposite surface of said table and overlying said opening, a moistening roll mounted adjacent the opposite surface of said table from said work piece and projecting through said table opening into engagement with said work piece operable to engage said work piece and apply solvent to a predetermined portion of said work piece, and a pair of rotatable pressure rolls mounted adjacent opposite surfaces of said table operable to engage the work piece and master card and bring the work piece and master card into pressure applying relation at said table opening to duplicate said printed material from said card onto said work piece.

References Cited in the file of this patent

UNITED STATES PATENTS

| | | |
|---|---|---|
| 1,411,210 | Hangel | Mar. 28, 1922 |
| 1,564,221 | Duncan | Dec. 8, 1925 |
| 1,996,954 | Elliott | Apr. 9, 1935 |
| 2,054,344 | Storck | Sept. 15, 1936 |
| 2,132,282 | Ajouelo | Oct. 4, 1938 |
| 2,262,250 | Ralston | Nov. 11, 1941 |
| 2,344,345 | Elliott | Mar. 14, 1944 |
| 2,419,345 | Elliott | Apr. 22, 1947 |
| 2,572,450 | Crissy | Oct. 23, 1951 |
| 2,740,354 | Gruver | Apr. 3, 1956 |
| 2,766,685 | Sauerman | Oct. 16, 1956 |
| 2,771,838 | Federwitz | Nov. 27, 1956 |
| 2,913,979 | Hoopes | Nov. 24, 1959 |